(12) United States Patent
Bendel et al.

(10) Patent No.: US 9,828,792 B2
(45) Date of Patent: Nov. 28, 2017

(54) ACTUATING UNIT FOR AUTOMOTIVE APPLICATIONS

(75) Inventors: Thorsten Bendel, Oberhausen (DE); Claus Topfer, Sindelfingen (DE); Winfried Schlabs, Bochum (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 198 days.

(21) Appl. No.: 13/819,671

(22) PCT Filed: Aug. 31, 2010

(86) PCT No.: PCT/DE2010/001017
§ 371 (c)(1),
(2), (4) Date: Feb. 27, 2013

(87) PCT Pub. No.: WO2012/028122
PCT Pub. Date: Mar. 8, 2012

(65) Prior Publication Data
US 2013/0152644 A1 Jun. 20, 2013

(51) Int. Cl.
| | |
|---|---|
| *E05B 81/06* | (2014.01) |
| *E05B 81/24* | (2014.01) |
| *H02K 7/06* | (2006.01) |
| *E05B 81/20* | (2014.01) |
| *H02K 7/08* | (2006.01) |
| *H02K 7/116* | (2006.01) |

(52) U.S. Cl.
CPC .............. *E05B 81/06* (2013.01); *E05B 81/25* (2013.01); *H02K 7/06* (2013.01); *E05B 81/20* (2013.01); *H02K 7/081* (2013.01); *H02K 7/1166* (2013.01); *Y10T 70/7062* (2015.04)

(58) Field of Classification Search
CPC .. F16H 25/20; F16H 2025/2031; F16H 27/02; H02K 5/173; H02K 7/06; H02K 7/081; H02K 7/1166; F16C 35/067; F16C 27/06; F16C 27/063; F16C 27/066; E05B 81/06; E05B 81/20; E05B 81/25
See application file for complete search history.

(56) References Cited

U.S. PATENT DOCUMENTS

| | | | | | |
|---|---|---|---|---|---|
| 2,062,290 | A | * | 12/1936 | Bott | .............................. 384/536 |
| 2,173,250 | A | * | 9/1939 | Fay | ....................... F16C 27/066 277/565 |
| 2,578,809 | A | * | 12/1951 | Ketchum | ................. H04R 1/16 174/110 R |
| 2,660,028 | A | * | 11/1953 | Geyer | ..................... F15B 13/10 310/76 |
| 2,772,104 | A | * | 11/1956 | Thiry | .................... F16C 27/063 267/269 |
| 3,061,386 | A | * | 10/1962 | Dix | ......................... F16C 27/04 29/898.07 |
| 3,372,963 | A | * | 3/1968 | Harris | ..................... F16B 21/18 384/537 |

(Continued)

FOREIGN PATENT DOCUMENTS

| | | |
|---|---|---|
| CN | 201466862 U | 5/2010 |
| DE | 2847588 A1 | 5/1980 |

(Continued)

*Primary Examiner* — William C Joyce
(74) *Attorney, Agent, or Firm* — Renner, Otto, Boisselle & Sklar, LLP

(57) ABSTRACT

Actuating unit for automotive applications, especially motor vehicle door locks (1), comprising a drive (2) and with a linear actuator (3, 4) which can be pressurised by the drive (2), wherein the drive (2) and the linear actuator (3, 4) are arranged at an angle, and especially at a right angle, to one another.

10 Claims, 1 Drawing Sheet

(56) References Cited

U.S. PATENT DOCUMENTS

| | | | | |
|---|---|---|---|---|
| 3,515,417 A * | 6/1970 | Bowman | ............... | A47C 7/004 |
| | | | | 16/2.1 |
| 4,636,106 A * | 1/1987 | Waisbrod | ................ | F16B 7/10 |
| | | | | 403/221 |
| 5,632,562 A * | 5/1997 | Kidzun | ................ | B62D 1/16 |
| | | | | 384/536 |
| 6,113,275 A * | 9/2000 | Blase | ................ | F16C 17/02 |
| | | | | 384/276 |
| 6,259,175 B1 * | 7/2001 | Alfano et al. | ................ | 310/20 |
| 7,223,020 B2 * | 5/2007 | Bauer | ................ | F16C 27/04 |
| | | | | 267/160 |
| 8,616,772 B1 * | 12/2013 | Kellar | ................ | F16C 17/18 |
| | | | | 384/10 |
| 2004/0057643 A1 * | 3/2004 | Blanchard | ................ | F16C 11/045 |
| | | | | 384/276 |
| 2007/0080593 A1 | 4/2007 | O'Donnell | | |
| 2007/0144281 A1 * | 6/2007 | Inoue | ................ | F16H 25/2015 |
| | | | | 74/89.23 |
| 2008/0069487 A1 | 3/2008 | Tada et al. | | |

FOREIGN PATENT DOCUMENTS

| | | |
|---|---|---|
| DE | 9204957 U1 | 6/1992 |
| DE | 9311960 U1 | 12/1994 |
| DE | 101 12 120 B4 | 6/2007 |
| EP | 0831250 A2 | 3/1998 |
| EP | 1101571 A2 | 5/2001 |
| FR | 1328737 A | 5/1963 |
| GB | 2012010 A | 7/1979 |
| GB | 204802 A | 6/1980 |

* cited by examiner

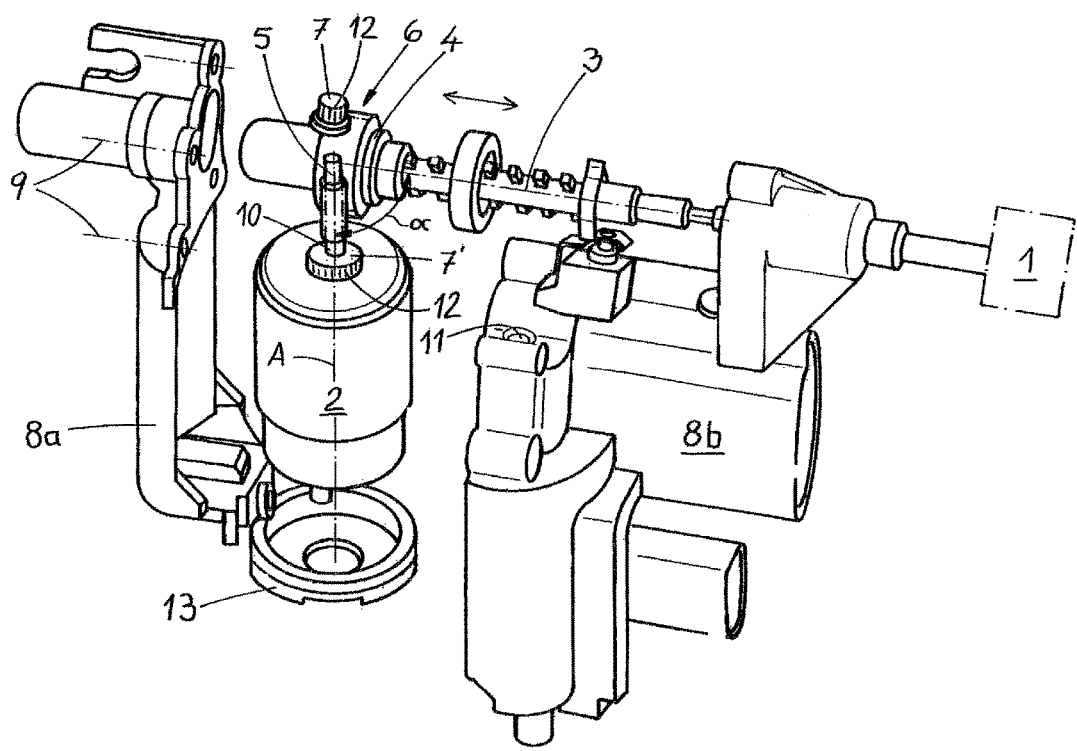

ACTUATING UNIT FOR AUTOMOTIVE APPLICATIONS

FIELD OF THE INVENTION

The invention relates to an actuating unit for automotive applications, especially motor vehicle door locks, with a drive, and with a linear actuator which can be pressurised by the drive.

BACKGROUND OF THE INVENTION

Such actuating units can be used as auxiliary closure devices for example, but are not restricted to this use, as presented inter alia in DE 1010 12 120 B4. In this case an auxiliary closure device works on the boot lid of a motor vehicle. An electric motor is provided for to this end which works on a linear actuator. The electric motor has a flange-mounted gearbox and is placed either in or on the boot lid.

Here, in practice, the problem often arises that the electric motor is not correctly aligned vis-à-vis the linear actuator during installation and/or demonstrates play. Vibrations can therefore occur during operation. As the actuating unit in question is usually used to pressurise motor vehicle door locks and also entire motor vehicle doors, these elements often function as resonators or can have this effect. However, operation of the aforementioned actuating units is often associated with troublesome noises. The aim of the invention as a whole is to create a remedy here.

SUMMARY OF THE INVENTION

Underlying the invention is the technical problem of continuing to develop an actuating unit for automotive applications in such a way that the background noise is improved as a whole.

To solve this technical issue, for a generic actuating unit the invention suggests that the drive and linear actuator are or become arranged at an angle to one another, in particular at a right angle to one another. Thus, any noise evolution from the drive is not transmitted at all or hardly transmitted to the linear actuator arranged at an angle to it. Because the angular and especially right angular arrangement of the drive on the one hand and the linear actuator on the other hand generally means that the drive and the linear actuator are connected via a worm drive. Such a worm drive is relatively insensitive with regard to any vibrations. Any play in the drive also tends to be easily brought under control. However, the background noise of the actuating unit which is the subject of the invention is thus significantly improved compared to previous embodiments.

Furthermore, the drive and the actuator are regularly accommodated together in a housing. This process also improves noise behaviour. Because the purpose of the housing is to encapsulate both the drive and the linear actuator. Consequently, noise emissions can be reliably suppressed externally. Added to this is the fact that any structure-borne transmission is considerably reduced, if not completely suppressed, due to the angular arrangement of both the drive and the linear actuator compared to previous embodiments.

Also, the fact that the drive is connected to the housing via at least one bearing point is of special independent significance for the invention. Two bearing points are usually used. Consequently, the drive is connected to the housing via two point bearing with the help of both bearing points. It proves especially advantageous if the respective bearing point is formed as a die seat.

Because such a die seat is generally equipped with bars which are regularly deformed during installation of the drive in the housing. The bars are usually flexible ribs. The bearing point can also comprise several components or a single component. One way or another, installation of the drive with the aid of one or several die seats causes the drive both to be perfectly aligned vis-à-vis the linear actuator and also for the drive to be permanently held without play in the housing.

The bearing point is generally formed in the housing. But the bearing point can also be executed on the drive. Furthermore, the bearing point can be defined on a separate bearing sleeve, namely in and/or on the relevant bearing sleeve. Finally, it has been proven when the bearing point is partially manufactured from a plastically easily deformable material such as plastic preferably in the form of crumple ribs.

Plastically easily deformable in this context means a material which is deformed or can be deformed during (manual) installation of the drive. For example, it may be that the drive is placed in the housing and the bearing point or the die seat undergoes the desired complete or partial deformation on its fixing in the housing. In this context, the housing may be executed in two or more parts. Recourse is generally had to a lid section and an upper section. Therefore as soon as the drive is placed in the housing, the described deformation of the bearing point occurs.

The drive is generally accommodated in the upper section. Furthermore, the linear actuator which is angularly connected to the drive can usually be found in the upper section. As soon as the drive—this is generally an electric motor—is placed, in accordance with the invention in the respectively formed die seat as a bearing point of the drive individual bars or flexible ribs are deformed. It is naturally also conceivable that no deformation or only slight deformation takes place if the drive or electric motor assumes its 'correct' and play-free position vis-à-vis the housing and also vis-à-vis the linear actuator from the outset.

However, the invention explicitly permits an alignment of the drive vis-à-vis the housing and/or vis-à-vis the linear actuator in certain limits specified by the respective die seat. After the drive or electric motor has assumed the desired alignment, it is retained for the entire operation because the pertaining bearing point has partially plastically deformed. The flexible ribs or the bars accomplished at this point ensure this primarily. This keeps the drive in the housing without play. Vibrations almost do not occur (any longer).

However, the drive or electric motor can be fixed with low tolerances and play-free and taking into account the possibility of its alignment vis-à-vis the housing and the linear actuator. This is of special significance for the effective and particularly low-noise operation of the motor. To this end, after further advantageous configuration the invention suggests that the drive demonstrates, in addition to the at least one die seat as a bearing point, a rubber bearing seat as a further bearing point. The rubber bearing seat is usually formed in a rubber ring which accommodates the drive wholly or partially. The purpose of this rubber ring is to regularly accommodate and enclose a base of the electric motor. On the contrary, one or both die seats can be found on the head of the electric motor. In fact, a die seat may be provided for on the end side of an output shaft of the electric motor. A further die seat may be provided for in the area of a collar which encompasses an opening of the output shaft by a motor housing. This is naturally not compulsory.

As already explained, the respective die seat or the flexible ribs can be directly formed in the housing which—like the die seat—is regularly made of plastic. But it is also possible to define the die seat or generally the bearing point in or on a separate bearing bushing. In this case, it is advantageous if the bearing bushing is made of plastic. For example, such a bearing bushing may be fitted onto the output shaft on the head side. With the aid of this bearing bushing, the drive or the electric motor equipped as such can then be placed in the pertaining bearing trough. The bearing bushing with the generally external flexible ribs or pertaining bars intervenes in an opening accommodating the bearing bushing. In this intervention, the flexible ribs deform and ensure perfect holding and accommodation of the output shaft for example. This procedure can be accomplished especially advantageously due to the fact that the drive is designed in a rotational symmetric manner and the bearing points can also be formed as pertaining ring or partial ring bushings.

As a result, an actuating unit for automotive applications is provided which is distinguished by especially low-noise operation. This low-noise operation can primarily be attributed to the fact that the drive or the electric motor regularly used at this point is placed in a housing and opposite the pertaining linear actuator, taking into account any low tolerances. Thus, the rotational movement provided by the drive on its output shaft is transmitted perfectly, precisely and in a low-vibration manner to the linear actuator. This may involve a spindle nut drive which naturally must only be understood as an example and is not restrictive.

Due to the precise installation of the drive into the housing not only is the noise behaviour optimised, but also the lifespan. Because any play of the drive vis-à-vis the linear actuator is ultimately limited to the worm drive which transmits the rotational movement of the output shaft into a rotational movement in the opposite direction to the spindle nut, for example. Due to the rotation of the fixed location spindle nut accommodated in the housing a spindle is moved backwards and forwards in a linear manner which transmits the desired actuating movement, for example to a closing handle, a motor vehicle swing door, a fuel filler flap, a tailgate, etc. The fundamental advantages can be seen here.

BRIEF DESCRIPTION OF THE DRAWING

The invention is explained in greater detail hereinafter on the basis of a sketch depicting only an execution example, the only FIGURE shows the actuating unit which is the subject of the invention in a perspective explosion depiction.

Other features and advantages of the present invention will become apparent from the following detailed description, taken in conjunction with the accompanying drawings which illustrate, by way of example, the principles of the invention.

DETAILED DESCRIPTION OF THE INVENTION

An actuating unit for automotive applications is depicted in the only FIGURE. In the case of automotive applications, it is not fundamentally restricted to actuating functions in conjunction with one or several motor vehicle door locks 1. In actual fact, the depicted actuating unit may be used for pressurising closure equipment on such a motor vehicle door lock 1, as described in DE 101 12 120 B4 for example. Of course, this only serves as an example and is not intended to be restrictive.

In order to be able to achieve this in detail, the actuating unit has a drive 2 and a linear actuator 3, 4 in its basic structure which is pressurised or can be pressurised by the drive 2. In detail, the linear actuator 3, 4 is a spindle drive with a threaded spindle 3 and a spindle nut 4 accommodated in housing 8b by means of a ball bearing or a slide bearing, which is only an example and is not intended to be restrictive however. The drive or electric motor 2 possesses an output shaft 5. The output shaft 5 transmits its rotational movements via a worm drive 6 to the linear actuator 3, 4 or the spindle nut 4. The spindle nut 4 which is housed in a fixed location thus starts to rotate and moves the spindle housed on the spindle nut 4 or the threaded spindle 3 backwards and forwards dependent on its direction of rotation, as indicated by a double arrow in the FIGURE. A Bowden cable or a comparable connecting element connected to the spindle 3 now transmits these linear actuating movements of the linear actuator 3, 4 to the motor vehicle door lock 1 in the example.

As part of the invention, the drive or electric motor 2 on the one hand and the linear actuator 3, 4 on the other hand must be arranged at an angle to one another. In actual fact, it can be recognised that the output shaft 5 of the drive or the electric motor 2 on the one hand and the threaded spindle 3 on the other hand describe a right angle α to one another. However, dependent on the configuration of the worm drive 6 other angular positions to one another can also be observed and set here. Thus, the rotational movements of the output shaft 5 can already be transmitted to the linear actuator 3, 4 precisely and in a low vibration manner.

An additional contributory factor to this is that the drive or electric motor 2 is connected to a housing 8b via two bearing points 7, 7'. In fact, the housing 8a, 8b is executed in two parts and fundamentally consists of a lid section 8a and an upper section 8b. One or several screws, rivets or comparable connecting elements 9 may be used to combine the two sections of housing 8a, 8b.

The respective bearing point 7, 7' is a die seat. Ultimately, as part of the example, two different bearing points or die seats 7, 7' are accomplished. Generally, the respective bearing point 7, 7' or the die seat 7, 7' is formed in a plastically deformable manner. The bearing points 7, 7' in question are made of plastic in the example.

The bearing point 7' comprises two or generally multiple sections and is defined in an aperture of the housing 8b. The die seat 7' internally accommodates a collar 10 of the motor bearing of the drive 2. This collar 10 is formed in the area of a housing of the drive or electric motor 2, in which the output shaft 5 exits the housing in question. This means the collar 10 surrounds an outlet opening of the output shaft 5 of the drive 2 from the pertaining housing.

The further bearing point 7 or the die seat 7 is formed to a bearing bushing 7 in the execution example. This bearing bushing 7 is a separate component for the accommodation of the drive 2; which is made of plastic—in the same way as housing 8a, 8b. In actual fact, the bearing bushing 7 in question is placed into a pertaining bearing bushing 11 of housing 8b in the installation of the drive 2. The bearing bushing 7 has been previously fitted onto output shaft 5. The bearing bushing 7 acts as a sliding bearing sleeve, which accommodates the head end of the output shaft 5.

One aspect that the bearing points or die seats 7, 7' have in common is that they are both equipped with bars 12. These bars or also flexible ribs 12 are ultimately located between the drive 2 and the housing 8b which accommodates the drive 2. The bars or flexible ribs 12 now experience plastic deformation in the installation of the drive 2 in the housing 8b. This is possible and desirable because the bearing point or the respective die seat 7, 7', especially the flexible rib 12 is made of a partially plastically easily deformable material, plastic in the example.

This applies from the outset for the bearing point or the die seat 7' because the housing 8a, 8b is formed as a plastic injection moulding component. The bearing bushing 7 is also a plastic injection moulding component. It is thus ensured that the bars or flexible ribs 12 experience the described plastic deformation in the installation of the drive 2 and the connection of the drive 2 with the housing 8b surrounding it with the bearing points. Because the construction is generally selected in such a way that the bars or flexible ribs 12 are of (slightly) greater dimensions with regard to their joint diameter than a pertaining diameter of the die seat 7, 7' or also the joint breaches which envelop the collar 10. This thus results in a more or less marked deformation of the bars 12 in the described installation however.

As a consequence of this, drive 2 fits firmly vis-à-vis the housing 8a, 8b. The bars or flexible ribs 12 also ensure a certain offsetting of tolerance in the installation. This means that drive 2 is perfectly aligned vis-à-vis the worm drive 6 and is practically play-free. Because in this installation process, the pertaining bars or flexible ribs 12 are deformed to such an extent that the drive 2 is perfectly aligned vis-à-vis the linear actuator 3, 4 and at the same time the accomplished bearing points 7, 7' ensure a tight fit.

In addition to the described bearing points 7, 7' a rubber bearing seat 13 is accomplished as a further bearing point for the drive 2. This rubber bearing seat 13 is defined in a rubber ring 13 wholly or partially accommodating the drive 2. In actual fact, the rubber ring 13 in question is of a barrel-shaped design and accommodates a base of the drive 2 which is used in the rubber ring 13 in question.

It is recognised that the drive or electric motor 2 is designed with rotational symmetry as a whole, namely in comparison to an axis A defined by the output shaft 5. As a consequence of this rotational symmetric design, the two bearing bushings 7, 7' are also designed in a rotational symmetric manner. The same applies to rubber ring 13. This means that for the bearing points 7, 7' in question and the rubber bearing seat 13 it involves ring or partial ring bushings respectively.

It is to be understood that the above-described embodiment is illustrative of only one of the many possible specific embodiments which can represent applications of the principles of the invention. Numerous and varied other arrangements can be readily devised by those skilled in the art without departing from the spirit and scope of the invention.

What is claimed is:

1. An actuating unit for motor vehicle door locks, comprising: a drive having an output shaft, and a linear actuator which can be pressurised by the drive, wherein
    the drive and the linear actuator are arranged at a right angle, to one another,
    the drive and the linear actuator are jointly accommodated in a housing and the drive is supported via a pair of bearing points,
    the pair of bearing points includes a first bearing point provided on a first end of the output shaft and a second bearing point provided on a second end of the output shaft opposite from the first end, each bearing point being a unitary component made of a same material comprising a central portion and a plurality of strip ribs made of the same material, the central portion defining an inner bearing surface for rotation of the output shaft and the plurality of strip ribs extends radially outward from the central portion and are deformed in the housing relative to the central portion during installation of the drive, the strip ribs being parallel to a central axis of the drive; and
the drive has a resilient bearing seat as a further bearing point for the drive in addition to the pair of bearing points.

2. The actuating unit in accordance with claim 1, wherein each bearing point is formed as a bearing bushing.

3. The actuating unit in accordance with claim 1, wherein the bearing points are formed in the housing and/or on the drive.

4. The actuating unit in accordance with claim 1, wherein each bearing point is provided for in and/or on a separate bearing bushing.

5. The actuating unit in accordance with claim 1, wherein the bearing points are made wholly or partially from a plastic.

6. The actuating unit in accordance with claim 1, wherein the resilient bearing seat is made of rubber.

7. The actuating unit in accordance with claim 6, wherein the rubber bearing seat is formed in a rubber ring which wholly or partially accommodates the drive.

8. The actuating unit in accordance with claim 1, wherein a lid section together with an upper section form the housing which comprises at least two sections.

9. The actuating unit in accordance with claim 1, wherein the drive is designed in a rotationally symmetrical manner and each bearing point is formed as a retaining ring or partial ring bushing.

10. The actuating unit in accordance with claim 1, wherein the strip ribs are plastically deformed when the bearing points are installed in the housing.

* * * * *